United States Patent
Meyer et al.

(10) Patent No.: US 10,957,975 B2
(45) Date of Patent: Mar. 23, 2021

(54) SYSTEM AND METHOD OF ADJUSTING ANTENNA BEAM ON ANTENNA TOWER

(71) Applicant: CommScope Technologies LLC, Hickory, NC (US)

(72) Inventors: Louis John Meyer, Shady Shores, TX (US); Scott Lynn Michaelis, Plano, TX (US); Ray K. Butler, Allen, TX (US)

(73) Assignee: CommScope Technologies LLC, Hickory, NC (US)

( * ) Notice: Subject to any disclaimer, the term of this patent is extended or adjusted under 35 U.S.C. 154(b) by 74 days.

(21) Appl. No.: 16/089,081

(22) PCT Filed: May 3, 2017

(86) PCT No.: PCT/US2017/030830
§ 371 (c)(1),
(2) Date: Sep. 27, 2018

(87) PCT Pub. No.: WO2017/192714
PCT Pub. Date: Nov. 9, 2017

(65) Prior Publication Data
US 2019/0131703 A1 May 2, 2019

Related U.S. Application Data
(60) Provisional application No. 62/331,703, filed on May 4, 2016.

(51) Int. Cl.
*H01Q 3/00* (2006.01)
*H01Q 1/00* (2006.01)
(Continued)

(52) U.S. Cl.
CPC ............. *H01Q 3/005* (2013.01); *H01Q 1/005* (2013.01); *H01Q 1/125* (2013.01);
(Continued)

(58) Field of Classification Search
CPC ...... H01Q 3/005; H01Q 1/005; H01Q 1/1228; H01Q 1/1242; H01Q 1/125; H01Q 1/246;
(Continued)

(56) References Cited

U.S. PATENT DOCUMENTS

| 2011/0199992 | A1* | 8/2011 | Barker ................. | H04W 16/28 370/329 |
|---|---|---|---|---|
| 2013/0171946 | A1 | 7/2013 | Veihl et al. | |

(Continued)

FOREIGN PATENT DOCUMENTS

| CN | 103650245 | 3/2014 |
|---|---|---|
| EP | 0106438 | 4/1984 |

OTHER PUBLICATIONS

International Preliminary Report on Patentability corresponding to International Application No. PCT/US2017/030830 dated Nov. 15, 2018.
(Continued)

*Primary Examiner* — Samina F Choudhry
(74) *Attorney, Agent, or Firm* — Myers Bigel, P.A.

(57) ABSTRACT

An antenna with adjustable tilt angle includes: a mounting structure; an antenna mount fixed to the mounting structure; an antenna mounted to the antenna mount, the antenna configured to produce an antenna beam; a remote electrical tilt (RET) unit operatively associated with the antenna to adjust a pointing tilt angle of the antenna beam; a tilt pointing direction sensor mounted to the antenna, the pointing direction tilt sensor configured to detect the a pointing angle of the antenna relative to a baseline standard; and a controller operatively connected with the RET unit and the pointing direction tilt sensor, the controller configured to receive signals from the pointing direction tilt sensor and
(Continued)

OMNI DIRECTIONAL
MINIMAL CAPACITY
1G

TRI-SECTOR
3x CAPACITY
2G-3G

SIX SECTOR
6x CAPACITY
4G transmit signals to the RET unit to adjust the tilt pointing angle of the antenna beam based on the detected angle of the antenna.

12 Claims, 6 Drawing Sheets

(51) Int. Cl.
| | | |
|---|---|---|
| *H01Q 3/26* | (2006.01) | |
| *H01Q 1/24* | (2006.01) | |
| *H01Q 3/06* | (2006.01) | |
| *H01Q 1/12* | (2006.01) | |
| *H01Q 3/32* | (2006.01) | |
| *H01Q 3/36* | (2006.01) | |
| *H01Q 21/22* | (2006.01) | |
| *H04W 16/28* | (2009.01) | |
| *H04W 84/18* | (2009.01) | |

(52) U.S. Cl.
CPC ......... *H01Q 1/1228* (2013.01); *H01Q 1/1242* (2013.01); *H01Q 1/246* (2013.01); *H01Q 3/06* (2013.01); *H01Q 3/26* (2013.01); *H01Q 3/32* (2013.01); *H01Q 3/36* (2013.01); *H01Q 21/22* (2013.01); *H04W 16/28* (2013.01); *H04W 84/18* (2013.01)

(58) Field of Classification Search
CPC ............ H01Q 3/32; H01Q 3/36; H01Q 21/22; H04W 16/28; H04W 84/18
See application file for complete search history.

(56) References Cited

U.S. PATENT DOCUMENTS

| | | | |
|---|---|---|---|
| 2013/0328716 A1 | 12/2013 | Le Sage | |
| 2015/0357708 A1* | 12/2015 | Au | H01Q 3/08 343/760 |
| 2016/0020504 A1 | 1/2016 | Michaelis et al. | |
| 2016/0035096 A1* | 2/2016 | Rudow | G01S 19/25 348/135 |

OTHER PUBLICATIONS

International Search Report corresponding to International Application No. PCT/US2017/030830 dated Aug. 8, 2017.
Written Opinion of the International Searching Authority corresponding to International Application No. PCT/US2017/030830 dated Aug. 8, 2017.
Office Action corresponding to Chinese Application No. 201780027369.3 dated Mar. 30, 2020.

* cited by examiner

SYSTEM AND METHOD OF ADJUSTING ANTENNA BEAM ON ANTENNA TOWER

CROSS-REFERENCE TO RELATED APPLICATION

The present application claims priority to U.S. Provisional Patent Application Ser. No. 62/331,703, filed May 4, 2016, the entire content of which is incorporated by reference herein as if set forth in its entirety.

FIELD OF THE INVENTION

The invention is directed generally to cellular communications systems, and more particularly to base station antennas for cellular communications systems.

BACKGROUND

Sectors for cellular networks have evolved over time, with the number of sectors increasing over time. FIG. 1 schematically illustrates three different versions of cellular antenna configurations: an omnidirectional single antenna (common for 1G communications); a tri-sector system in which each of three antennas covers approximately 120 degrees in the azimuth plane (more common for 2G and 3G communications); and a six-sector system in which each antenna covers approximately 60 degrees in the azimuth plane (designed for 4G/LTE and newer systems). Three-sector systems are still relatively common with 4G communications, but 6-sector configurations are becoming more popular as time goes on (and even higher numbers of sectors) are possible.

The performance of a cellular base station in the regions of the coverage area for the base station that are between adjacent sectors (one such region is identified in FIG. 1 at dot A) where the beams slightly overlap is becoming critical. Long Term Evolution (LTE) systems require that the size of these areas be reduced as much as possible so that interference from one sector to another is reduced or minimized. Reducing the area of overlap may be achieved by using narrower antenna beams. However, as the beams become more narrow, the beam pointing direction (both in the azimuth and elevation planes) becomes more critical to avoid interference and/or gaps in coverage. A representative gap in coverage is illustrated in FIG. 1 in the six sector image at dot B. As can be seen, these coverage gap areas refer to areas where none of the antenna beams provide coverage to the area. It may be possible to arrange an adjacent cell site such that the gaps in coverage are "filled in" by the antenna beam from the adjacent cell site.

Some network operators use network planning tools to plan for the number of sectors, desired antenna beam shapes etc. They input the possible location of the cellular base station, population and crowd information, terrain, etc., then simulate predicted coverage and iterate on antenna models, pointing directions, radio power levels etc. to achieve the best possible predicted coverage area for the base station. They then order the base station antennas that will produce antenna beams having the necessary beamwidths, gains etc. that the planning tools indicated. They then generate instructions as to which antennas get installed on which tower, the azimuth angles to which each antenna should be pointing, and the downtilt in the elevation plane (if any) for each antenna. The installers then install the base station antennas on the towers or building tops using external tools to point the antennas to the specified directions in the azimuth and elevation planes.

There are some perceived shortcomings of these systems. In some instances, the installers may misalign the base station antenna during installation, with the pointing direction being off by, for example, several degrees. In other instances, the antenna may be installed correctly but then moved due to wind, an accidental bump by a technician, or some other event, such that the antenna is no longer pointing where it should be. In further instances, the technicians may make an error in data recording, with the result that the operator thinks that the antenna is installed differently than it actually is. In still further instances, the location of the tower may be slightly off (e.g., by several meters or more), such that the beam is not pointing exactly where it should be.

Further complicating matters, on some support structures (especially monopoles), the sway at 60 mph wind conditions can approach+/−2 degrees and at 90 mph can be as severe as +/−8 degrees. The amount of sway may be a function of, among other things, the structural integrity and height of the tower. Thus, the sway of the mounting structure may be sufficient to negatively impact antenna performance. In addition, in many instances mounting hardware that was designed to support, for example, antennas is now being used to additionally mount several remote radio units (RRUs). This added weight and wind loading is causing antenna mounts (and hence the antennas attached thereto) to move an additional amount in windy conditions, thereby exacerbating performance issues.

SUMMARY

As a first aspect, embodiments of the invention are directed to an antenna, comprising: a mounting structure; an antenna mount fixed to the mounting structure; an antenna mounted to the antenna mount, the antenna configured to produce an antenna beam; a remote electrical tilt (RET) unit operatively associated with the antenna to adjust a pointing angle of the antenna beam; a pointing direction sensor mounted to the antenna, the pointing direction sensor configured to detect a pointing angle of the antenna relative to a baseline standard; and a controller operatively connected with the RET unit and the pointing direction sensor, the controller configured to receive signals from the pointing direction sensor and transmit signals to the RET unit to adjust the pointing angle of the antenna beam based on the detected angle of the antenna.

As a second aspect, embodiments of the invention are directed to a method of adjusting a pointing direction of an antenna, comprising the steps of: providing an antenna mounted to a mounting structure, a pointing direction sensor mounted to the antenna, the antenna producing an antenna beam in a first direction; transmitting signals from the pointing direction sensor to a controller regarding a pointing direction of the antenna relative to a baseline standard; and transmitting signals from the controller to a remote electrical tilt (RET) unit operatively associated with the antenna directing the antenna to electronically adjust a pointing direction of the antenna beam to a second pointing direction that differs from the first pointing direction, the second pointing direction being selected based on the signals transmitted by the pointing direction sensor.

As a third aspect, embodiments of the invention are directed to an adjustable antenna, comprising: a mounting structure; an antenna mount fixed to the mounting structure; an antenna mounted to the antenna mount, the antenna configured to produce an antenna beam; an automated adjustment unit operatively associated with the antenna to adjust at least one of tilt, roll and azimuth of the antenna beam; a sensor mounted to the antenna, the sensor configured to detect at least one of tilt, roll and azimuth of the antenna relative to a baseline standard; and a controller operatively connected with the automated unit and the sensor, the controller configured to receive signals from the sensor and transmit signals to the automated adjustment unit to adjust the tilt, roll or azimuth angle of the antenna beam based on the detected orientation of the antenna.

As a fourth aspect, embodiments of the invention are directed to an active antenna, comprising: a phased array antenna that includes an array of radiating elements that are arranged as a plurality of sub-arrays of radiating elements, each sub-array including at least one radiating element, the phase array antenna being configured to generate at least a first antenna beam; a plurality of active radios, each active radio coupled to a respective one of the sub-arrays; a sensor system mounted within, on or adjacent the phased array antenna, the sensor system configured to detect at least one of tilt angle, roll angle and azimuth angle of the phased array antenna relative to one or more baseline standards; and a controller that is configured to receive signals from the sensor system and transmit signals to one or more of the active radios to electronically adjust one or more of the tilt angle, roll angle or azimuth angle of the first antenna beam based on a detected orientation of the phased array antenna.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
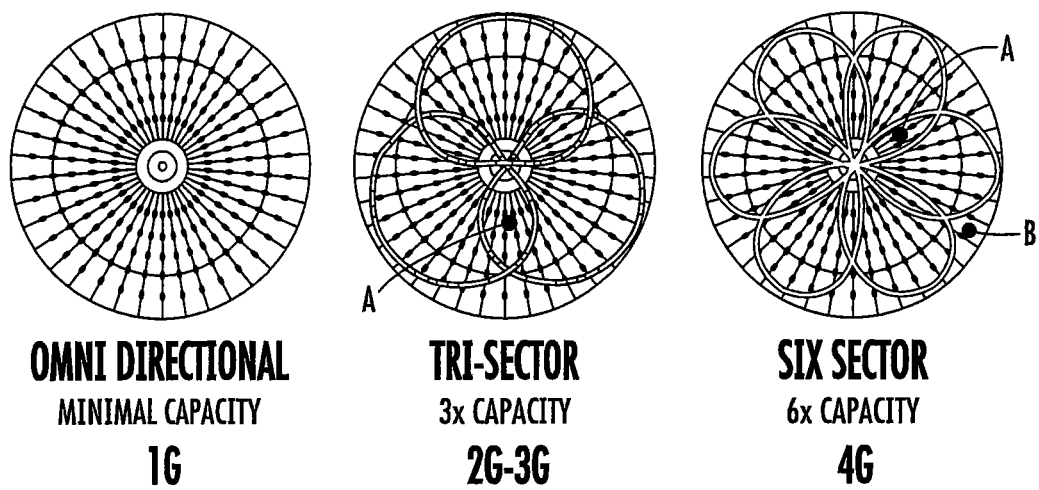
FIG. 1 is a schematic diagram showing three different antennas (an omnidirectional antenna, a three-sector antenna, and a six-sector antenna) and exemplary antenna beam patterns for each in the azimuth plane.
Figure 2:
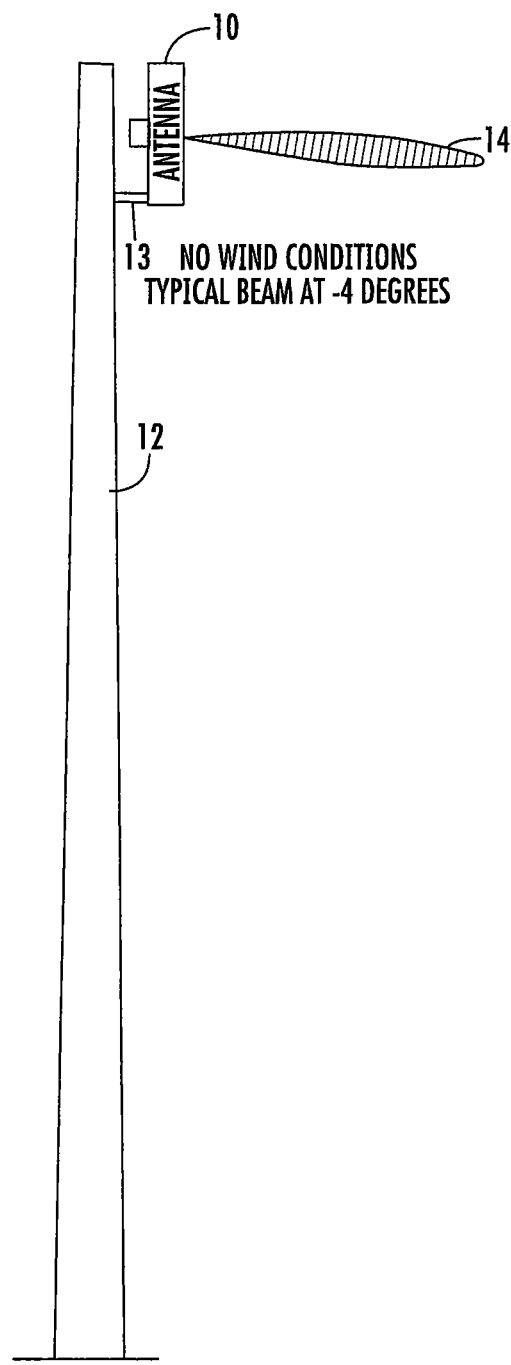
FIG. 2 is a schematic diagram of an antenna tower with an antenna mounted thereto in windless conditions, showing the antenna beam with an elevation angle downtilt of −4 degrees to horizontal.
Figure 3:
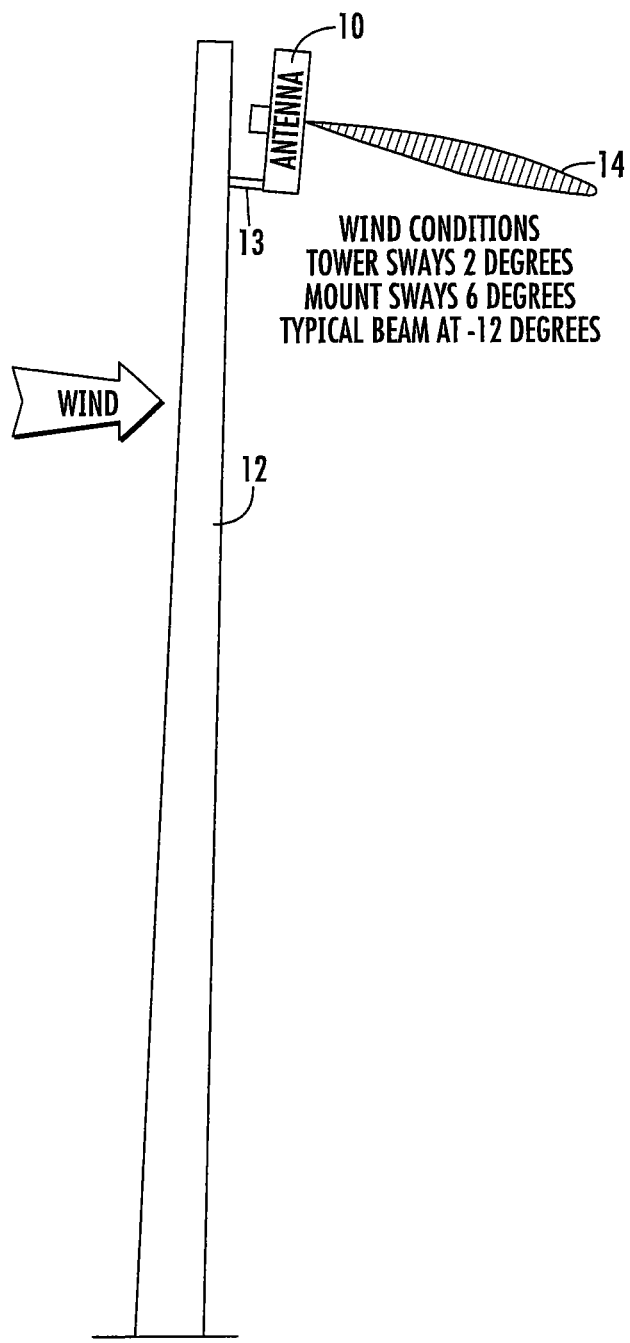
FIG. 3 is a schematic diagram of the antenna tower and antenna of FIG. 2 in windy conditions, showing how wind can increase downtilt of the antenna beam to an unacceptable orientation relative to horizontal.

Referring now to the drawings, a phased array antenna 10 mounted on a monopole 12 via an antenna mount 13 under windless conditions is shown in FIG. 2. A typical antenna beam is shown schematically at 14 with a downtilt of −4 degrees from horizontal. FIG. 3 shows the same antenna 10 under typical high wind conditions. It would not be unusual for the monopole 12 to sway as much as +/−2 degrees under windy conditions. Moreover, the mount may also capture the wind and cause additional sway of +/−6 degrees, such that the antenna 10 sways a total of +/−8 degrees. Adding this −8 degrees of tilt in the elevation plane to the original −4 degrees of downtilt of the beam 14, the beam 14 is oriented at −12 degrees relative to horizontal, which can significantly impact antenna performance. Likewise, when the sway is in the opposite direction, adding +8 degrees of tilt in the elevation plane to the original −4 degrees of downtilt of the beam 14, the beam 14 is oriented at +4 degrees relative to horizontal, which again can significantly impact performance, particularly in terms of interference with adjacent cellular base stations.

Figure 4:
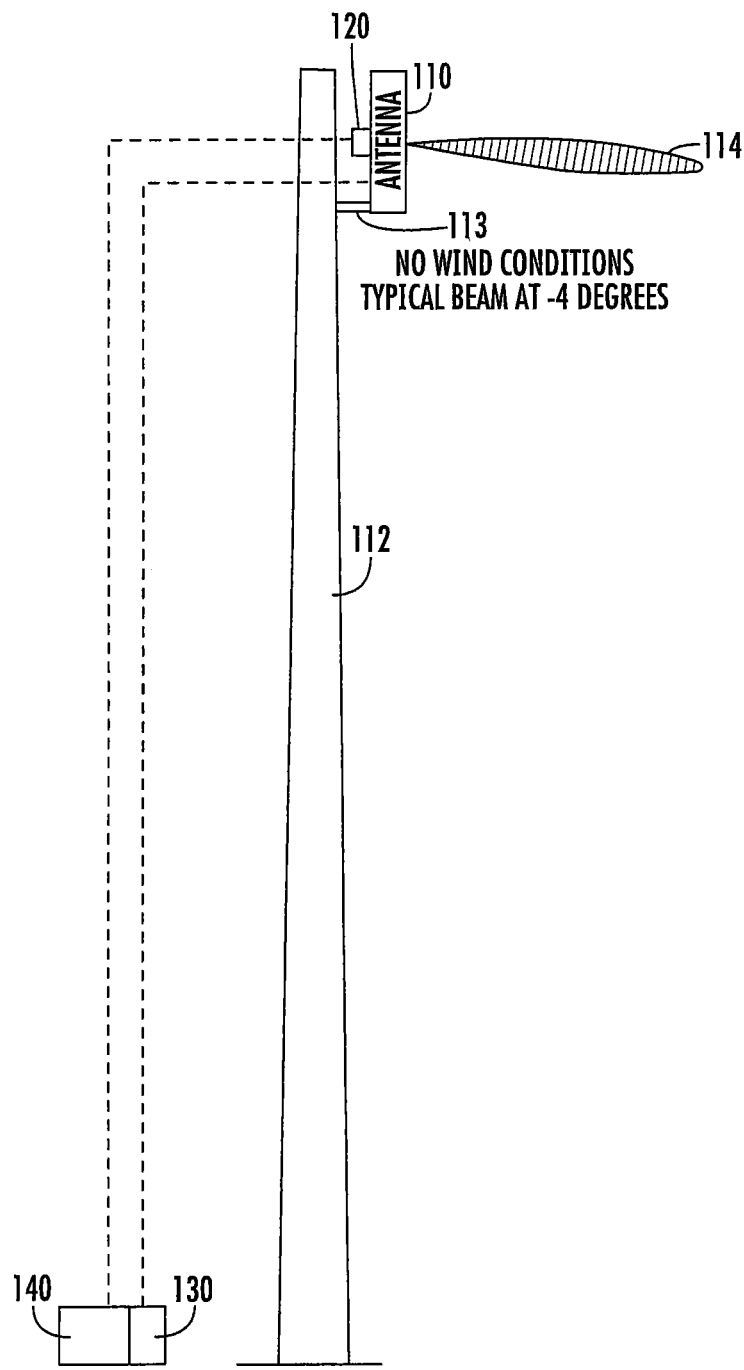
FIG. 4 is a schematic diagram of an antenna tower and antenna mounted thereto with a tilt sensor according to embodiments of the invention.

Referring now to FIG. 4, an antenna 110 mounted on a monopole 112 via an antenna mount 113 is shown therein. A tilt sensor 120 is mounted to the antenna 110 to sense the orientation (i.e., the tilt in the elevation plane) of the antenna 110. The tilt sensor 120 can monitor the sway of the complete mounting system (tower plus mounts) in each antenna sector (typically three sectors are present, although only one antenna is shown herein). The tilt sensor 120 can be any sensor that detects the orientation of the antenna relative to horizontal or another baseline standard (i.e., the degree of uptilt/downtilt in the antenna 110). Exemplary sensors include accelerometers, gyros, and 9-degree of freedom sensors.

Pursuant to some embodiments of the present invention, the tilt readings from the tilt sensor 120 can be used to adjust the Remote Electrical Tilt (RET) settings of, for example, a high-band LTE antenna in order to counteract the sway in each antenna sector. RET units (one is shown schematically at 130 in FIG. 4) are well known in the art and are used to adjust the phases of the sub-components of a radio frequency (RF) signal that are transmitted or received through the respective individual radiating elements of a phased array antenna based on control signals from a remote location in order to redirect the antenna beam at a desired elevation angle. Adjustable phase shifters are provided in the antenna 110 that perform the phase adjustments that modify the elevation angle. An exemplary RET unit is described in U.S. Pat. No. 8,558,739, the disclosure of which is hereby incorporated herein in its entirety. A controller 140 receives the data from the tilt sensor 120, processes the data, and signals the RET unit 130 to adjust the beam of the antenna 110 accordingly by adjusting the phase shifters on the antenna 110. It should be noted that while the acronym "RET" stands for "remote electrical tilt", that term is used herein to a unit that may be used to electronically adjust a pointing direction of a beam of an antenna, and is not limited to units that can solely adjust a "tilt" or elevation angle of the antenna. For example, in some embodiments, the RET unit may be used to electronically adjust an azimuth pointing direction of an antenna beam.

It will be appreciated that in order to correct for sway caused by wind, it will be necessary to very quickly detect the sway, determine the necessary adjustments to the phase shifters that will counteract the sway, provide control signals to the RET unit to adjust the settings on the phase shifters and then adjust those phase shifter settings so that the electronic downtilt applied tracks and corrects for the sway in real time. Most conventional phase shifters used in base station antennas are electro-mechanical phase shifters such as the phase shifters disclosed in the above-referenced U.S. Pat. No. 8,558,739. The response times of these phase shifters (i.e., how quickly they can be programmed to change the electronic downtilt angle for an associated base station antenna) is typically too slow to compensate for the sway of an antenna due to windy conditions. However, various electronic phase shifters are now available and/or in development that may have much faster response times allowing the downtilt of the antenna to be continually adjusted in response to data received from a tilt sensor in order to compensate for sway.

In some embodiments, an interface circuit is present to enable the sensor output to communicate with a desired (Antenna Interface Standards Group (AISG) protocol to transmit the data output from the tilt sensor 120 to the controller 140. In other embodiments, alternative signaling techniques may be used. In some embodiments, each base station antenna 110 may have an integrated tilt sensor 120 that provides tilt information directly to a controller in the base station antenna 110 (not shown) and the controller in the base station antenna 110 may use the tilt information to determine the settings for the phase shifters in the antenna 110 that compensate for the sway and control the phase shifters to adjust to the new settings. In this fashion, electronic phase shifters may be used to adjust the downtilt of each base station antenna 110 in order to compensate for sway of the antenna tower 112 and/or antenna mount 113 that results, for example, because of windy conditions. In this fashion, the elevation angle of each base station antenna 110 may be maintained in a desired pointing direction, which enhances coverage and reduces interference with base station antennas in adjacent sectors and/or adjacent cells.

In some embodiments, it may be desirable for the antenna 110 to be configured to be capable of producing an uptilted beam (i.e., to have an elevation angle of greater than zero). Typically antennas are configured to produce a downtilted beam (measured when the structure to which the antenna is mounted is in windless conditions and thus is still and stable), as doing so provides better performance for the antenna network by producing lower levels of interference between adjacent cellular base stations. However, as discussed above in connection with FIG. 3, the extent of sway of the antenna due to wind may be sufficient to re-orient an antenna beam as much as +/−8 degrees or more. Therefore, in this system the antenna 110 may be designed with both uptilt and downtilt capabilities in order to counteract both positive and negative mounting structure sway. In some embodiments, the system may be capable of tilting the antenna over a range of at least 20 degrees relative to horizontal. Also, in some embodiments the system may be configured to provide at least 5 degrees of uptilt to the beam relative to horizontal, and in some embodiments at least 8 degrees.

The RET unit 130 may be of any type recognized by those of skill in this art to be suitable for use in remotely adjusting the tilt of an antenna beam. For example, some current RET units are electromechanical and adjust the positions of components of the antenna to modify the beam tilt. Such a system (as designed today) may not be real-time, as it could soon exceed the total number of adjustments allowed for acceptable mechanical fatigue/cycle performance. Thus, a system may only adjust the angle of the antenna beam via the RET unit 130 when sensor data indicates a pre-determined differential from normal is exceeded (e.g., ±3 degrees) and/or after a short time delay prior to re-adjustment to avoid physical wear on the parts. The RET unit 130 may also be an electronic system (i.e., having no moving parts), which can make the required changes in real time with no fear of mechanical failure, thereby enabling the system to adjust the beam elevation angle based on active swaying of the tower/antenna.

Figure 5:
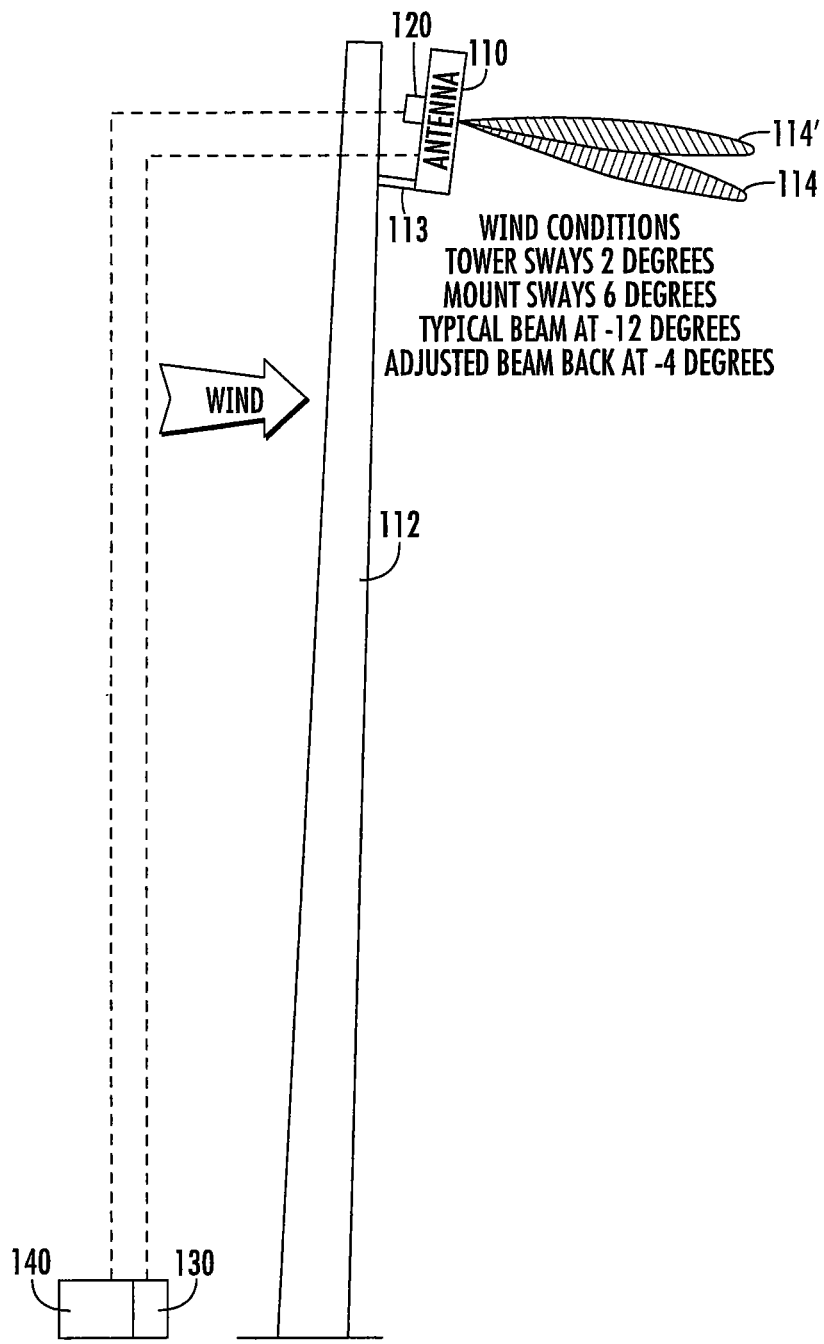
FIG. 5 is a schematic diagram of the antenna tower and antenna of FIG. 4, showing how adjustment of the beam orientation based on the tilt sensor mounted to the antenna can provide an acceptable beam downtilt angle under windy conditions.

FIG. 5 demonstrates how the tilt sensor 120 can adjust the antenna 110 to produce an acceptable antenna beam under windy conditions. The antenna 110 in FIG. 5 is subjected to the same wind conditions as the antenna 10 in FIG. 3, which cause a sway of −8 degrees at the antenna 110. However, rather than producing a beam 114 at an unacceptable beam angle of −12 degrees as in FIG. 2, the beam angle of the antenna 110 in FIG. 5 is adjusted. The tilt sensor 120 provides data that indicates −8 degrees of sway to the controller 140. Based on instructions from the controller 140, the RET unit 130 then adjusts the beam angle of the antenna 110 with 8 degrees of uptilt relative to the antenna 110, to produce a beam 114' that exits the antenna 110 at an acceptable −4 degrees relative to the horizon.

Variations and enhancements of the system described and illustrated herein are contemplated. For example, the sensor 120 may have the capability of also sensing azimuth and/or roll angle and therefore can provide information that enables the antenna adjustments to be performed. Phased array antennas that have more than one vertical array of radiating elements are being deployed and/or developed for 4G and 5G applications. When a phased array antenna has multiple vertical columns of radiating elements, phase shifters may be included in the antenna that allow for electronic adjustment of the azimuth pointing angle of the antenna, which is referred to as beam steering, The location and elevation (height) of the antenna 110 are known. The sensor 120 can provide information about the azimuth, downtilt and roll of the antenna. Many of the technical challenges outlined above regarding sector coverage may be overcome by allowing an antenna to self-point as much as possible via an automated adjustment unit. An installer can mount the antenna 110 on the top of the monopole 112 or tower in generally the right direction. The antenna 110 can then establish its latitude, longitude, elevation (and infer the height above ground if it is told or can obtain the average terrain elevation for its sector), and determine its azimuth, tilt and roll from the sensor 120. The antenna 120 can then, through an automated adjustment unit, steer the antenna beam at a "target" it has been given by adjusting the settings of phase shifters that set the electronic tilt of the antenna beam and the azimuth pointing angle of the antenna beam. The target may be a latitude, longitude and altitude coordinate for the center of the beam, a 3 dB point at boresight, a 3, 6, 10 or 12 dB crossover point between sectors, or another suitable target. The adjustment unit can then monitor changes over time and adjust the antenna 110 to keep the beam pointed at the target.

As one example, "beacons" may be physically placed in the center of the cell or on the edge of the coverage area. These beacons may receive signals transmitted by the base station antennas, measure the received signal strength or other such parameters of the RF signals transmitted by the base station antenna, and then transmit information about beam strength observed back to the base station antenna and/or related equipment at the base station. This data could be used to automatically adjust (a) just the tilt or (b) the tilt, azimuth and beamwidth of the antenna 110. The beacons may then be removed after the set-up is complete, or may be employed more permanently to provide real-time feedback.

Similar adjustments may also be carried out when the antenna is in operation, once again avoiding the need for a technician to climb the tower to manually adjust the antenna 110. For example, data from a self-optimizing network (SON) that collects performance data from user handsets and recommends antenna adjustments that may be employed may be used to determine the adjustments that are made to the tilt (elevation) angle and/or the azimuth angle of each base station antenna. Such performance data may be effective at identifying and correcting static problems with the antenna pointing direction that may result from mis-installation or other factors that result in a permanent change of the antenna pointing direction over time. Other external sources may also provide data that is employed by the automated adjustment unit to determine how the tilt, roll and/or azimuth of the antenna should be adjusted.

Installers' time on a tower installing an antenna is typically very expensive. Reducing the overall antenna installation time by eliminating the need for the installer to adjust azimuth, downtilt and/or roll while on a tower can reduce any additional expense of a "smart" antenna. Since the antennas according to embodiments of the present invention may be configured to, for example, automatically correct for antenna mis-alignment issues by electronically adjusting the pointing angle of the antenna, the number of tower climbs and the associated expense of such tower climbs may be reduced.

The use of active antennas is also increasing with the development and deployment of 4G and 5G technology. An exemplary active antenna may include radios and power amplifiers for each individual radiating element of the phased array, or for sub-arrays of multiple radiating elements (but less than all of the radiating elements). The use of active antennas allows digital beamforming where the phases of the RF signals supplied to different radiating elements or sub-arrays of radiating elements may be adjusted at the radios to perform, for example, electrical downtilts and/or adjustment of the azimuth pointing direction or the beamwidth of the antenna beam.

Pursuant to further embodiments of the present invention, active base station antenna arrays may be provided that are configured to correct for pointing errors in an antenna beam formed by the antenna. These antennas may receive or collect data indicative of the pointing direction of the antenna beam. The received/collected data may comprise, for example, data from a tilt sensor, data from a sensor that measures an azimuth pointing direction of the antenna, or data from another source such as, for example, a beacon and/or a self-optimizing network. The active antenna may adjust the amplitude and/or phase of at least some of the sub-components of an RF signal that is transmitted by the active antenna to electronically adjust the pointing direction and/or beamwidth of an antenna beam formed by the active antenna in response to the received/collected data.

In some embodiments, the active antenna may electronically adjust the pointing direction of the antenna beam to account for sway of the antenna that results from sway of the antenna tower and/or sway of an antenna mount. The adjustment may be performed in real time in order to substantially maintain a desired pointing direction for the antenna beam. This may enhance the capacity of the base station and/or reduce interference with other sectors and/or base stations. The active antennas according to embodiments of the present invention may also correct for errors in the pointing direction that occur for other reasons, such as installation errors.

Figure 6:
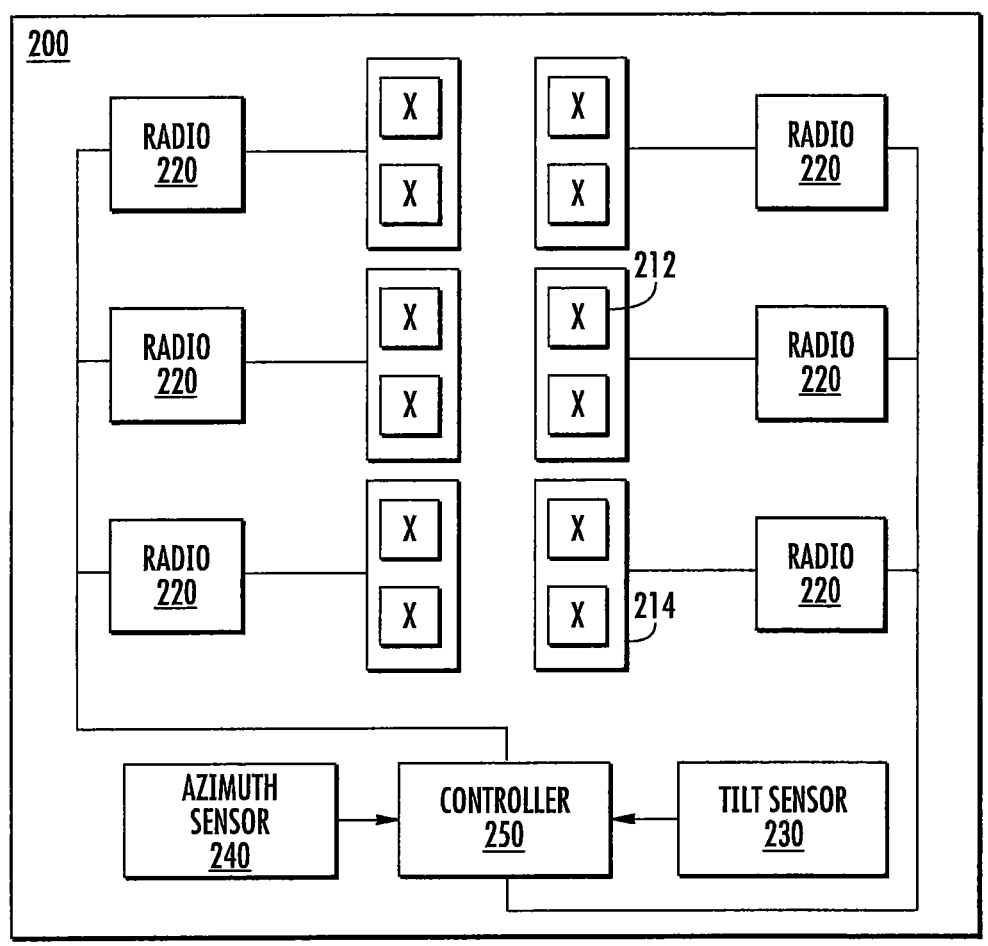
FIG. 6 is a schematic block diagram of an active antenna according to embodiments of the present invention.

FIG. 6 is a schematic block diagram of an active antenna 200 according to embodiments of the present invention. As shown in FIG. 6, the active antenna 200 includes a plurality of radiating elements 212 that may form a phased array 210. The phased array 210 illustrated in FIG. 6 includes twelve radiating elements 212 arranged in two columns and six rows, but it will be appreciated that any number of rows, columns and radiating elements 212 may be used. It will also be appreciated that an active radio 220 may be provided for each radiating element 212 or that the radiating elements 212 may be arranged in sub-arrays 214 with a single active radio 220 provided for each sub-array 214. In the depicted embodiment, six active radios 220 are provided, with each active radio 220 coupled to a respective sub-array 214 that includes two radiating elements 212. The active antenna 200 further includes an internal controller 250.

The active antenna 200 further includes one or more pointing direction sensors. In the depicted embodiment, the active antenna 200 includes two such sensors, namely a tilt sensor 230 and an azimuth pointing direction sensor 240. The tilt sensor may sense an elevation angle of the active antenna 200 and the azimuth pointing direction sensor 240 may sense an azimuth angle of the antenna. In the depicted embodiment, the tilt sensor 230 and the azimuth pointing direction sensor 240 are each mounted on the active antenna 200 and/or may be part of the active antenna 200. Such an arrangement may be convenient as then the outputs of the tilt sensor 230 and the azimuth pointing direction sensor 240 may be coupled to the internal controller 250 internally within the antenna without the need for separate external connections (which may require weatherproofed connectors, connections by installers, etc.). It will be appreciated, however, that in other embodiments the tilt sensor may monitor the tilt sensor 230 and the azimuth pointing direction sensor 240 may be mounted in other locations, such as, for example, on an antenna mount on which the active antenna 200 is mounted.

The tilt sensor 230 and the azimuth pointing direction sensor 240 may measure/determine the respective elevation angle and the azimuth angle of the active antenna 200 (or data from which the elevation angle and the azimuth angle may be determined). This data may be measured/determined in real time and provided by the tilt sensor 230 and the azimuth pointing direction sensor 240 to the internal controller 250. The internal controller 250 may use the data to determine phase offsets that should be applied in real time to the RF signals being transmitted and/or received by the respective active radios 220 that will electronically steer the peak of the antenna beam (or antenna beams) formed by active antenna 200 to a desired pointing direction. In this manner, the active antenna 200 can automatically correct for fixed errors in the pointing direction of the active antenna 200 caused by, for example, installation errors, as well as for dynamically changing errors in the pointing direction caused by, for example, wind. It is believed that deviations from a desired pointing angle for the active antenna 200 could be sensed and the pointing angle of the active antenna 200 could be changed electronically with a response time on the order of a millisecond or less, which should be quick enough to almost completely correct for unwanted deviations from the desired pointing direction due to factors such as wind.

As other potential variations, mounting structures other than the monopole 112 (e.g., an antenna tower) may be employed. A variety of antenna mounts may be used; exemplary antenna mounts are shown in U.S. Provisional Patent Application Nos. 62/104,898, filed Jan. 19, 2015, and 62/154,111, filed Apr. 28, 2015, the disclosures of which are hereby incorporated herein. Also, although the RET unit 130 and controller 140 are illustrated as being remote from the antenna 110, in other embodiments either or both may be located at the top of the tower 112. In such embodiments, the RET unit 130 and/or controller 140 may be integrated with the sensor 120 and/or the antenna 110.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An antenna, comprising:
a mounting structure;
an antenna mount fixed to the mounting structure;
an antenna mounted to the antenna mount, the antenna configured to produce an antenna beam;
a remote electrical tilt (RET) unit operatively associated with the antenna to adjust a pointing angle of the antenna beam;
at least one pointing direction sensor mounted to the antenna, the at least one pointing direction sensor configured to detect an elevation angle of the antenna relative to a horizontal baseline standard in real time and detect an azimuth angle relative to an azimuth baseline standard in real time; and
a controller operatively connected with the RET unit and the at least one pointing direction sensor, the controller configured to receive signals from the at least one pointing direction sensor and transmit signals to the RET unit to adjust the pointing angle of the antenna beam based on the detected elevation angle and azimuth angle of the antenna.

2. The antenna defined in claim 1, wherein the RET unit comprises a controller and at least one phase shifter.

3. The antenna defined in claim 1, wherein the at least one pointing direction sensor comprises a tilt sensor that comprises an accelerometer, gyro or nine degree of freedom sensor.

4. The antenna defined in claim 1, wherein the antenna comprises a phased array antenna.

5. The antenna defined in claim 3, wherein the antenna is configured such that a tilt angle of the antenna beam can be adjusted over a range of at least ±8 degrees.

6. The antenna defined in claim 1, wherein the antenna produces a beam having an elevation beamwidth of between about 3 and 5 degrees.

7. The antenna defined in claim 1, wherein the at least one pointing direction sensor comprises a tilt sensor.

8. A method of adjusting a pointing direction of an antenna, comprising the steps of:
providing an antenna mounted to a mounting structure, a pointing direction sensor mounted to the antenna, the antenna producing an antenna beam in a first direction;
transmitting signals from the pointing direction sensor to a controller regarding a pointing direction of the antenna relative to a horizontal baseline standard in real time;
transmitting signals from the controller to a remote electrical tilt (RET) unit operatively associated with the antenna directing the antenna to electronically adjust a pointing direction of the antenna beam to a second pointing direction that differs from the first pointing direction relative to horizontal, the second pointing direction being selected based on the signals transmitted by the pointing direction sensor.

9. The method defined in claim 8, wherein the RET unit comprises controller and at least one phase shifter.

10. The method defined in claim 8, wherein the pointing direction sensor comprises a tilt sensor.

11. The method defined in claim 8, wherein the antenna comprises a phased array antenna.

12. The method defined in claim 8, wherein the antenna is configured such that the first beam angle and the second beam may vary over a range of at least ±8 degrees.

\* \* \* \* \*